United States Patent [19]

Merkle

[11] Patent Number: 4,629,919
[45] Date of Patent: Dec. 16, 1986

[54] DIRECT DRIVE MOTOR

[75] Inventor: Alfred Merkle, St. Georgen, Fed. Rep. of Germany

[73] Assignee: Papst-Motoren GmbH & Co., St. Georgen, Fed. Rep. of Germany

[21] Appl. No.: 456,525

[22] Filed: Jan. 7, 1983

[30] Foreign Application Priority Data

Jan. 11, 1982 [CH] Switzerland .................... 122/82

[51] Int. Cl.⁴ .................................................. H02K 5/00
[52] U.S. Cl. .................................. 310/90; 310/67 R; 384/517
[58] Field of Search .................... 310/67, 67 A, 90; 384/517

[56] References Cited

U.S. PATENT DOCUMENTS

| | | | |
|---|---|---|---|
| 2,104,707 | 1/1938 | Rawlings | 310/67 A |
| 2,735,028 | 2/1956 | Brouwer | 310/67 |
| 3,807,815 | 4/1974 | Kasabian | 384/517 |
| 4,040,685 | 8/1977 | Berglund | 384/517 |
| 4,074,158 | 2/1978 | Cole | 310/90 |
| 4,209,721 | 6/1980 | Feldle et al. | 310/90 X |
| 4,346,949 | 8/1982 | Beau | 310/90 X |
| 4,364,615 | 12/1982 | Euler | 384/517 |

Primary Examiner—Donovan F. Duggan
Attorney, Agent, or Firm—Fitch, Even, Tabin & Flannery

[57] ABSTRACT

Direct drive motor, particularly for disk storage drives, spindle drives and the like, with a rotor shaft rotatably mounted in a bearing support by two axially spaced bearings, whose outer rings are fixed with respect to the bearing support. The inner ring of one bearing is fixed to the rotor shaft and the inner ring of the other bearing is connected to the rotor shaft in friction fit manner, which prevents radial movements and permits a relative axial movement between the inner ring and rotor shaft.

11 Claims, 1 Drawing Figure

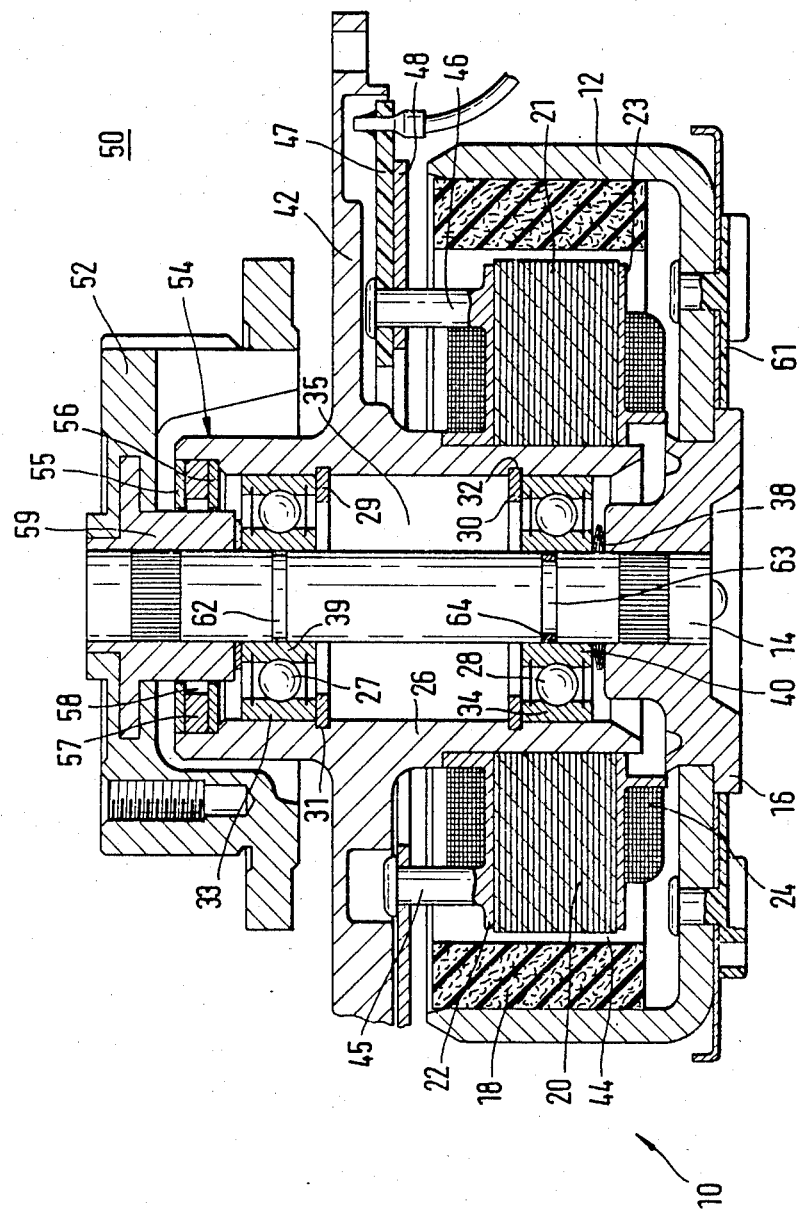

DIRECT DRIVE MOTOR

The invention relates to a direct drive motor, particularly for disk storage drives, spindle drives and the like, with a rotor shaft rotatably mounted in a bearing support means by use of two axially spaced bearings, whose outer rings are fixed with respect to the bearing support means.

Such motors are known from U.S. Pat. No. 4,438,542 and the U.S. Pat. No. 4,519,010 Disk storage drive and spindle drive direct motors must function with particularly low vibration and noise levels. High requirements must be fulfilled by the disk carrier hub with respect to concentricity, which may only vary within the narrowest limits over many years operation. Hitherto, these operating requirements have made it necessary to use precision bearings, which generally require expensive precision ball bearings and expensive precision parts for the mounting of such bearings.

A problem of the invention is to provide a direct drive motor making it possible to obtain high running accuracy with relatively coarsely toleranced parts.

On the basis of a motor of the aforementioned type, the invention solves this problem in that, the inner ring of one bearing is fixed to the rotor shaft, while the inner ring of the other bearing is connected to the rotor shaft for common rotation therewith in a manner preventing radial movements between the inner ring and the rotor shaft while permitting a relative axial movement between the inner ring and rotor shaft.

As a result of the relative mobility between the inner ring of the other bearing and the rotor shaft, it is possible to accommodate different thermal expansions. However, simultaneously relative twisting between the inner ring and the rotor shaft is prevented. The latter is particularly important, because in the case of data equipment, like hard disk memories, the absolute runout is normally a multiple of the nonrepeatable runout, which is in turn essentially caused by undesired relative rotary movements between the inner ring and the shaft. For example, if the inner ring of the bearing is eccentric, but no relative rotation occurs from time to time between the inner ring and the shaft, the shaft rotation will be consistent even though eccentric, and the registration between the read/write head and the disk will be repeatable.

The inner ring of one bearing and the outer rings of both bearings can preferably be bonded to the rotor shaft or the bearing support means. In particular, the bearing bores of the bearing support means receiving the outer rings can be coarsely toleranced and the two bearings can be bonded in precisely aligned manner in the bearing support means. The latter can easily be achieved with an efficient auxiliary device. In addition to the bearing bores, in such a case the shaft, as well as the bearing inner and outer diameters can be comparatively coarsely tolerances. This significantly reduces the manufacturing expenditure.

For the purpose of a friction fit connection between the inner ring of the other bearing and the rotor shaft, which permits relative axial movements therebetween, it is possible to provide an elastic member, preferably in the form of an O-ring, which ensures a radial bracing between the inner ring and the rotor shaft. The elastic member can be coated with an adhesive and held in a circular groove of the rotor shaft. It has been found that such an elastic member reliably prevents in operation radial displacements of the motor rotation axis, e.g. by vibrations in the clearance between the bearing inner ring and the shaft.

The bearings can be held in relative axial spacing by means of retaining rings, which project into circular grooves of the bearing bores and which engage with the facing surfaces of the outer rings. Instead of this, it is possible to insert a spacer in the bearing bores and said spacer engages against the facing surfaces of the outer rings. It is important in this connection that the stop member in the form of retaining rings or the spacer offers an at least punctiform engagement for the bearings and once again the bearing longitudinal abutment can be relatively coarsely toleranced.

The motor is appropriately designed as an external rotor-type motor with a rotor casing, which is connected to the rotor shaft and is positioned coaxial thereto. The bearing surpport means can simply be constituted by a bearing tube receiving two ball bearings. However, it is also possible to provide other bearing receptacles, e.g. two separate bearing elements.

DESCRIPTION OF THE DRAWING AND PREFERRED EMBODIMENT

The invention is described in greater detail hereinafter relative to a non-limitative embodiment and the attached drawing in the form of a section through an external rotor—direct drive motor for hard disk memories in accordance with the present invention.

The direct drive motor 10 is constructed as a brushless direct current motor with a cup-shaped rotor casing 12, which is concentric to a rotor shaft 14 and is fixed thereto by means of a hub 16, inserted in a central opening of the rotor casing. A plurality of permanent magnet pieces or a one-part permanent magnet ring 18 is inserted in a rotor casing 12 made from good magnetically conducting material. The permanent magnet ring preferably comprises a mixture of hard ferrite, e.g. barium ferrite, and elastic material forming a so-called rubber magnet. The latter is radially magnetized across the pole pitch in a trapezoidal or approximately trapezoidal manner with a relatively small pole clearance. The rotor casing 12 can be manufactured as a deep drawn part.

A winding core 20 forms part of the stator of motor 10 and comprises the actual stator iron 21, generally in the form of laminations, as well as end plates 22, 23 and which carries a stator winding 24. The winding core 20 is mounted on a bearing tube 26. Rotor shaft 14 is mounted in bearing tube 26 with the aid of two ball bearings 27, 28, which are kept reciprocally axially spaced by retaining rings 29, 30, which are inserted in circular grooves 31, 32 of bearing tube 26. They engage with the facing surfaces of outer rings 33, 34 of ball bearings 27, 28. It is possible to provide in place of the rings 29, 30, a not shown spacer, which is inserted into bore 35 of bearing tube 26 and against whose end faces engage outer rings 33, 34. A cup spring 38 is supported on the bottom of inner ring 40 of ball bearing 28 and the end face of hub 16 facing said ball bearing, so that ball bearings 27, 28 are axially braced with respect to one another. In the present embodiment, bearing tube 26 forms a one-piece die cast member, together with an assembly flange 42. Instead of this, bearing tube 26 can be located by press fit in a hub connected to assembly flange 42.

Magnet ring 18 and winding core 20 define a cylindrical air gap 44. A printed wiring board 47 and a shielding plate 48 made from magnetically good conducting material are connected by supports 45, 46 to the end plate 22 of the stator. Shielding plate 48, in conjunction with rotor casing 12 and ball bearing 27, prevents the escape of magnetic stray fields into the space 50 containing the read-only memory disks. Wiring board 47 carries the drive electronics and optionally a speed regulating circuit, which are not illustrated here. Assembly flange 42 makes it possible to fit motor 10 to a hard disk memory partition which, in per se known manner (e.g. DOS No. 3,108,204) U.S. Pat. No. 4,438,542 separates space 50 from the remainder of the equipment interior. A hub 52 used for receiving one or more read-only memory disks is fixed to the upper end of rotor shaft 14. In order to seal the bearing system of rotor shaft 14 from the read-only memory disk receiving space 50, a magnetic liquid seal 54 is introduced into bearing tube 26 in the area between hub 52 and bearing 27. Seal 54 consists of two pole pieces 55, 56, a permanent magnet ring 57 located between the pole pieces and a magnetic liquid, which is introduced into a ring slot 58 between the magnetic ring 57 and a socket 59 fixed to rotor shaft 14.

To the outside of the base of rotor casing 12 is fixed an axially flat radial impeller 61, constructed e.g. as an injection moulded part and which attracts the air in the central area and discharges it radially outwards.

Ball bearings 27, 28 are bonded in precisely aligned manner using a precision auxiliary device into the relatively coarsely toleranced bearing tube bore 35 in the vicinity of its outer rings 33, 34. In addition, inner ring 39 of one ball bearing 27 (the upper ball bearing in the embodiment) is bonded to rotor shaft 14. For this purpose, the rotor shaft 14, has an annular clearance 62 into which is introduced the adhesive at the time of assembly. The inner ring 40 of the other ball bearing 28 is axially easily displaceable with respect to rotor shaft 14. Into a circular groove 63 of rotor shaft 14 is inserted an elastic member, in the present embodiment in the form of an adhesive-coated O-ring 64. O-ring 64 prevents inner ring 40 from twisting with respect to rotor shaft 14, but permits axial movements of shaft 14 with respect to bearing 28 in the face of differing thermal expansions or the like. O-ring 64 prevents displacements of the rotation axis of motor 10 during operation, e.g. due to vibrations within the clearance between inner ring 40 and shaft 14. O-ring 64 makes the non-repeatable runout, as would in particular occur through a migration of inner ring 40 in the circumferential direction with respect to shaft 14, particularly small. The elastic member, e.g. the O-ring, can be made from plastic, rubber or metal.

I claim:

1. In a direct drive motor, particularly for disk storage drives and spindle drives having a rotor shaft rotatably mounted in a bearing support means by means of two axially spaced bearings, each having an inner ring and an outer ring, the outer rings being fixed with respect to the bearing support means, the improvement comprising the inner ring (39) of a first of the bearings (27) being connected to the rotor shaft (14) in a fixed manner and the inner ring (40) of the second of the bearings (28) being connected to the rotor shaft in a friction fit manner, preventing radial and relative rotative movements between the inner rings and the rotor shaft (14) while permitting relative axial movement between the inner ring (40) of the second of the bearings and the rotor shaft (14).

2. Direct drive motor according to claim 1, wherein the inner ring (39) of the first of the bearings (27) and the outer rings (33,34) of both bearings (27,28) are bonded to the rotor shaft (14) and the bearing support means (26), respectively.

3. Direct drive motor according to claim 2, wherein the bearing bore (35) of the bearing support means (26) receiving the outer rings (33,34) are coarsely toleranced and the two bearings (27,28) are bonded in precisely aligned manner in the bearing support means (26).

4. Direct drive motor according to one of the preceding claims, wherein that for the friction fit, axial movement-permitting connection between the inner ring (40) of the second of the bearings (28) and the rotor shaft (14), an elastic member (64) is provided for radial bracing between said inner ring (40) and rotor shaft (14).

5. Direct drive motor according to claim 4, wherein the elastic member (64) is an O-ring.

6. Direct drive motor according to claim 5, wherein the O-ring (64) is coated with adhesive.

7. Direct drive motor according to claim 4, further including a circular groove (63) in the rotor shaft (14) in which the elastic member (64) is held.

8. Direct drive motor according to claim 4 further including a bore 35 within said bearing support means and wherein said means holding the bearings in relative axial spacing within the bearing support means includes (a) circular grooves (31,32) in the walls of the bearing bore (35) and (b) retaining rings (29,30) projecting into the circular grooves (31,32) and engaging the inner facing surfaces of the outer rings (33,34).

9. Direct drive motor according to claim 4, wherein the motor (10) is an external rotor-type motor with a rotor casing (12) joined to the rotor shaft (14) coaxially thereto.

10. Direct drive motor according to claim 4, wherein the bearing support means that receives the two bearings is a bearing tube (26).

11. Direct drive motor according to claim 4 further including means holding the bearings (27,28) in relative axial spacing within the bearing support means.

* * * * *